(12) United States Patent
Zhao et al.

(10) Patent No.: US 7,082,186 B2
(45) Date of Patent: Jul. 25, 2006

(54) CONTAINER INSPECTION SYSTEM USING COBALT-60 γ-RAY SOURCE AND CESIUM IODIDE OR CADMIUM TUNGSTATE ARRAY DETECTOR

(75) Inventors: Jinggi Zhao, Fang shan District (CN); Huimin Chen, Fang shan District (CN); Qifang Han, Fang shan District (CN); Zhicheng Huang, Fang shan District (CN); Li Chen, Fang shan District (CN); Yongging Li, Fang shan District (CN); Bo Meng, Fang shan District (CN); Hancheng Sun, Fang shan District (CN); Jinhan Luo, Fang shan District (CN); Yishan Wang, Fang shan District (CN); Hong Li, Fang shan District (CN); Chuan Jin, Fang shan District (CN); Guoping Dong, Fang shan District (CN); Xiaoyuan Huang, Fang shan District (CN); Mingwen Dong, Fang shan District (CN); Junqing Liu, Fang shan District (CN); Yonghong Yang, Fang shan District (CN); Dong Li, Fang shan District (CN); Xiaodong Yao, Fang shan District (CN); Quan Zhou, Fang shan District (CN)

(73) Assignee: Beijing Isotope Nuclear Electronic Machine Co. Ltd., Fang shan District (CN)

( * ) Notice: Subject to any disclaimer, the term of this patent is extended or adjusted under 35 U.S.C. 154(b) by 120 days.

(21) Appl. No.: 10/480,448

(22) PCT Filed: Jun. 28, 2002

(86) PCT No.: PCT/CN02/00451

§ 371 (c)(1),
(2), (4) Date: Mar. 11, 2004

(87) PCT Pub. No.: WO03/021243

PCT Pub. Date: Mar. 13, 2003

(65) Prior Publication Data

US 2004/0179647 A1     Sep. 16, 2004

(30) Foreign Application Priority Data

Sep. 3, 2001     (CN) .................. 01 1 31144

(51) Int. Cl.
*G01N 23/04*     (2006.01)
*G21K 1/00*     (2006.01)
*G21K 1/02*     (2006.01)

(52) U.S. Cl. .................... 378/57; 378/145; 378/147

(58) Field of Classification Search ........... 378/57–62, 378/98.8, 145–147, 160; 250/515.1
See application file for complete search history.

(56) References Cited

U.S. PATENT DOCUMENTS

| | | | | | |
|---|---|---|---|---|---|
| 4,064,440 | A | * | 12/1977 | Roder | 378/57 |
| 4,239,969 | A | * | 12/1980 | Haas et al. | 378/57 |
| 4,303,860 | A | | 12/1981 | Bjorkholm et al. | |
| 4,599,740 | A | * | 7/1986 | Cable | 378/57 |
| 5,065,418 | A | * | 11/1991 | Bermbach et al. | 378/57 |
| 5,838,758 | A | * | 11/1998 | Krug et al. | 378/53 |
| 5,838,759 | A | | 11/1998 | Armistead | |
| 5,974,111 | A | * | 10/1999 | Krug et al. | 378/57 |
| 6,031,890 | A | * | 2/2000 | Bermbach et al. | 378/57 |
| 6,218,943 | B1 | * | 4/2001 | Ellenbogen | 340/572.4 |
| 6,274,100 | B1 | * | 8/2001 | Shepherd et al. | 422/186.3 |
| 6,347,132 | B1 | * | 2/2002 | Annis | 378/57 |
| 6,407,873 | B1 | * | 6/2002 | Tuchman | 359/894 |
| 6,507,025 | B1 | * | 1/2003 | Verbinski et al. | 250/358.1 |
| 6,542,580 | B1 | * | 4/2003 | Carver et al. | 378/57 |
| 6,563,903 | B1 | | 5/2003 | Kang et al. | |

FOREIGN PATENT DOCUMENTS

| | | |
|---|---|---|
| CN | 1039664 | 9/1998 |
| CN | 1051616 | 4/2000 |
| CN | 1068118 | 7/2001 |
| CN | 1301960 | 7/2001 |

* cited by examiner

Primary Examiner—Edward J. Glick
Assistant Examiner—Irakli Kiknadze
(74) Attorney, Agent, or Firm—Nixon & Vanderhye P.C.

(57) ABSTRACT

A container inspection equipment with cobalt-60 γ-ray source and cesium iodide or cadmium tungstate detector includes a cobalt-60 γ-ray source, a cask, a front collimator, a rear collimator, a cesium iodide or cadmium tungstate detector, signal and image processing systems, container trailer system, and automatic control system. The cask of the cobalt-60 γ-ray source, the beam shutter, and the front collimator are fixed on the same chassis to form an integration and placed in the source room. The rear collimator, cesium iodide or cadmium tungstate array detector and the radiation catcher are fixed on the same chassis to form an integration and placed in the detector room. A container inspection tunnel is formed between the source room and the detector room. The equipment is mainly used for inspecting smuggling goods and contrabands etc., in large containers, container trucks, train carriage and air containers. The equipment either can be installed in the sea port and land frontier customs or installed at the air port, vital communication line, and railway station.

10 Claims, 3 Drawing Sheets

CONTAINER INSPECTION SYSTEM USING COBALT-60 γ-RAY SOURCE AND CESIUM IODIDE OR CADMIUM TUNGSTATE ARRAY DETECTOR

This application is a U.S. national phase of international application PCT/CN02/00451 filed 28 Jun. 2002, which designated the U.S. PCT/CN02/00451 claims priority to CN Application No. 01131144.4 filed 3 Sep. 2001. The entire contents of these applications are incorporated herein by reference.

TECHNICAL FIELD

The invention relates to the nuclear technology application field, and especially to container inspection equipment with cobalt-60 γ-ray source and cesium iodide or cadmium tungstate detector. The invention also relates to an inspection method which combines γ-ray imaging and photo probing for detecting contrabands in large containers and train carriage etc.

BACKGROUND OF INVENTION

According to the combination of a radiation source and a detector, the existing container inspection system or equipment can be generally divided into the combination of electron accelerator, including electron linear and electrostatic accelerator, and scintillation detector or gas detector, and the combination of cobalt-60 γ-ray source or cesium-137 γ-ray source and gas detector. The inspection system or equipment is made from the combination of the electron accelerator as the radiation source and the scintillator as the radiation detector. For example, the British Aerospace Company and the Russian Institute of Electrophysics use the combination of linear electron accelerator and cadmium tungstate (CdWO$_4$) scintillation detector (cf. Jigang An. The research and development of container inspection system, ISOTOPE, Vol.8, No.1, 1995, in Chinese); the Heimann Company (Germany) uses the combination of linear electron accelerator and cesium iodide (cf. Radiation Source and Detector Configuration of the HEIMANN Container Inspection System).

The inspection system or equipment is constituted of electron accelerator as the radiation source and gas detector as the radiation detector. For example, the Schlumberger Company (France) uses electrostatic electron accelerator and gas multi-wire proportional chamber, and Tsinghua Tongfang Nuchtech Co., Ltd. (China) uses linear electron and gas pressurized ionization chamber (Chinese patent CN1242519A).

The inspection system or equipment is constituted of cobalt-60 γ-ray source as the radiation source and gas detector as the detector. For example, Beijing Hualixing Sci-Tech Development Co., Ltd. uses cobalt-60 γ-ray source and gas pressurized ionization chamber (Chinese patent CN1242519A).

The inspection system or equipment manufactured from the three combinations mentioned above has the following defects:

The defects when using electron accelerator as the radiation source are as follows: The electron accelerator is complicated in structure, big and heavy, difficult in manufacture, long production cycle, high manufacture cost. The electron accelerator needs special technicians in charge of operation and maintenance. The power consumption is high (several 10 kW) involving high voltage (several 10 kV to several 100 kV). The key component (e.g. klystron) needs regular replacement. The annual operating expense is very high and the probability of accelerator failure is also higher. It needs not only very high expense in repair and maintenance (the annual maintenance expense for container inspection system of accelerator type will be up to 0.8~1.28 million USD), but also a long shutdown time for maintenance, thus it directly influence the Customs in search for smuggler. The radiation output from electron accelerator is very high, and the thickness of concrete shielding wall is required to be 2~2.5 m for the main part of protection building. In addition, the field angle subtended by exposure field of high X-ray produced by accelerator is small (~30°), then it requires increasing the distance between the accelerator target and the detector to be more than 10 m. Therefore, the building area for inspection system of using accelerator as the radiation source is very large and the building expenditure is very high which may reach to 2.5~4 million USD. Plus the value of the detector, the total cost for the inspection system using electron accelerator will come to 8~10 million USD.

The defects when using gas detector are as follows: The detection efficiency of the gas detector is much less than that of the scintillation detector, such as cesium iodide or cadmium tungstate. For example, the detection efficiency of multi-wire proportional chamber is about 25%. In a super high pressure gas ionization chamber, the detection efficiency for cobalt-60 γ-ray is only about 13% when the electrode length is 20 cm and xenon gas is filled to $5\times10^6$ Pa (50 atm). The gas multi-wire proportional chamber is a gas flow type detector, and the anode wire in the proportional chamber is very thin (several 10 μm) with length of 200~300 mm, so that it is easy to induce noise signal due to vibration. The high pressure (pressurized) gas ionization chamber is complicated in structure and more difficult in workmanship. The filling (gas) pressure is $1.0\times10^6$ Pa ~$1.0\times10^7$ Pa (10~100 atm). When the ionization chamber is filled with gas to a pressure of $5\times10^6$ Pa (50 atm), the pressure resistance on the chamber case will reach to $8\times10^6$ Pa (80 atm). For this reason, the ionization chamber case wall will be appropriately thick and also shall be strengthened by adding strengthening rib. The total gas leakage rate of the sealed gas must be less than $1\times10^{-9}$ torr.L/s, otherwise it will directly influence the working life of ionization chamber. The insulation resistance of insulator used in the ionization chamber shall be more than $1\times10^{12}$ Ohm, the gas leakage rate shall be less than $1.0\times10^{-10}$ torr.L /s. In addition, the complicated electrode system, and the thick and heavy case for pressure resistance will markedly increase the volume and the weight of the detecting unit. It is more difficult to make the ionization chamber due to extremely severe requirement in tightness and insulation. The gas detector is easily influenced by external interference factors such as temperature, moisture, vibration and electromagnetics.

Therefore, when electron accelerator and gas detector are used in the container inspection system, not only the technology is complicated, the equipment is heavy and price is high, but also the operation and maintenance expense is very high with the result that many customers are turned away. This greatly limit extensive application in radiation imagery and nondestructive inspection technique field, so that the development in using container inspection system in search for smuggler by the customs is very slow.

SUMMARY OF INVENTION

It is an object of the invention to overcome the above shortcoming in the container inspection system or equipment of the existing technology. It provides a container inspection equipment characterized by easy production, low cost, excellent performance, being stable and reliable, high detection efficiency, clear image, low expenditure in operation and maintenance, low radiation output and easy to be shielded and safety.

The container inspection equipment with cobalt-60 γ-ray source and cesium iodide or cadmium tungstate detector according to the present invention includes a γ-ray source 1 and a cask 2 for shielding the source;
a front collimator 3 and a rear collimator 5;
a detector and the related electronic circuit 6;
a signal and image processing system 10; and
a container trailer system 9 and an automatic control system 11,
wherein:
the radiation source is a cobalt-60 γ-ray source or a cesium-137 γ-ray source 1;
the detector is a cesium iodide or cadmium tungstate array detector 6; the cobalt-60 γ-ray source is equipped with a beam shutter 2' capable of automatically open and close, the beam shutter is connected with the cask 2 of the γ-ray source;
the cesium iodide or cadmium tungstate array detector 6 is a strip array constituted of blocks in series arrangement consisting of several cesium iodide or cadmium tungstate scintillation crystals, a coupled silicon photodiode and a electronic circuit;
the cask 2 of the cobalt-60 γ-ray source 1, the beam shutter 2', and the front collimator 3 are fixed on the same chassis to form an integration, being placed in the source room I;
the rear collimator 5, cesium iodide or cadmium tungstate array detector 6 and the radiation catcher 7 are fixed on the same chassis to form an integration, being placed in the detector room III; between the source room I and the detector room III is a container inspection tunnel II; and
the signal and image processing system 10 and the automatic control system 11 are located in the control and image processing room IV.

In the container inspection equipment with cobalt-60 γ-ray source and cesium iodide or cadmium tungstate detector according to the present invention, the radiation source is a cobalt-60 γ-ray source or cesium-137 γ-ray source, and the cobalt-60 γ-ray source is preferred. The cobalt-60 γ-ray source is a source with high specific activity, the total activity is not exceeding 20.35 TBq (500 Ci), and the dimension of the active area is only 5~7 mm. The cesium-137 γ-ray source with high specific activity also can be used for inspecting air container or other small objects. The transport flask 12 of the cobalt-60 γ-ray source is a lead castle. The shielding effect of the lead castle is sufficient to meet the radiation safety requirement during transportation. The cask of the cobalt-60 γ-ray source is made of metals, such as tungsten, lead and iron etc. and the alloys thereof. The cobalt-60 γ-ray source is placed in the center of the tungsten alloy semi-sphere, and the lead semi-sphere is placed between the tungsten alloy semi-sphere and the transport flask. The tungsten alloy semi-sphere and lead semi-sphere are combined together and enveloped with a stainless steel case to form an integrated cask. The dose equivalent rate at a point of 1 m from the external surface of the cask is ≦100 μSv/h. The cask 2 is opposite-joint with the transport flask 12, and a ferrule is added at the joint to assure that there is no γ-ray leakage during source transfers from transport flask to the cask.

The beam shutter 2' of the cobalt-60 γ-ray source is a swing type iron shutter. The shutter's open or close is achieved by electromagnetic driver and restoring spring, and the open or close duration is less than 0.3 second. The beam shutter is connected with the tungsten alloy of the cask, the collimating slit between them is accurately aligned with the slit of the front collimator, and the slit width is 6~8 mm. The γ-rays emitted from the cobalt-60 source are collimated to be a sheet form sector beam with horizontal field angle 0.1°~1° and vertical field angle 60°~70°. In the beginning of inspecting the container, the shutter is actuated by the electromagnetic driver to make the shutter open within 0.3 second, or preferably 0.1 second, to let the γ-ray emit out. After the container is inspected, the shutter is actuated by the restoring spring to make the shutter close within 0.3 second, or preferably 0.1 second, to let the γ-ray from emitting out. The stroke of the shutter is only 3 cm, under the condition of power cut off and restoring spring failure, the shutter will be closed automatically by virtue of itself gravitation to assure safety of maintenance personnel. As for the cobalt-60 γ-ray source, its energy is constant and the intensity remains stable and reliable. There is no need to adjust the working condition, also there is no need for repair, surveillance and maintenance during operation and no need of person on charge. Furthermore, there is no need to shutdown for maintenance. However, the accelerator needs regular replacement of key component and shutdown for maintenance, the maintenance expenditure requires as high as about one million USD per year. In the cobalt-60 γ-ray source system, there is no electrical apparatus of high power consumption, there is no interference suffered either from high voltage or from intense microwave, therefore the cobalt-60 system is operated more stable and reliable. The radiation output from the cobalt-60 γ-ray source is lower than that of the accelerator by a factor of several hundreds and easy to protect, the radiation dose received by the inspected object is very low, especially to meet the safety requirement for protecting the undeveloped graphic film. The area occupied by the inspection equipment with cobalt source as the radiation source is small and the building construction cost is low. As a result, the total cost of inspection equipment and the related building construction is fairly low which is only one-third of that of the container inspection system with accelerator as the radiation source.

The front collimator is made of iron, lead, or alloys thereof to form a single dog-leg line shape. Its height is dependent on the dimension of the container to be inspected and the distance from the radiation source to the detector. The slit width is dependent on the distance from the radiation source to the detector and the dimension of pixel and in general is 6~8 mm. The slit of the front collimator may be very close to that of the shutter in order to make the γ-ray coming out from the slit of the shutter enter directly into the slit of the front collimator and decrease the scattered radiation rays. The length of the front collimator can be greatly reduced and thus the weight can be reduced. The front collimator, the cask and the beam shutter are combined into an integration so as to facilitate its movement, installation and test.

The rear collimator is made of iron, lead, or alloys thereof to form a single dog-leg line shape which is the same as that of the array detector. The rear collimator, the radiation detector and the radiation catcher are combined into an integration so as to facilitate its installation and test. The slit width of the rear collimator is equal to or a little more than the width of the crystal in the array detector and shall be strictly aligned with the slit of the front collimator and the active area of the cobalt-60 γ-ray source. The cross section of the rear collimator may be rectangular or circular. Under the condition to get the same effect for shielding scattered radiation, the collimator with circular cross section will reduce the weight by about 20% (see FIG. 8).

A recess may be made in the rear collimator at the joint of the detector and the rear collimator, the detector is placed in the recess and receives γ-ray from the rear collimator slit, then the side scattering radiation is blocked off, which make the image clearer (see FIG. 9).

The cesium iodide or cadmium tungstate array detector is a strip array constituted of blocks in series arrangement in the vertical direction consisting of several detector units which contains a certain quantity of pixel detector elements. The detector elements may be up to 1400. The detector element is a block comprised of cesium iodide or cadmium tungstate scintillation crystals, a coupled silicon photodiode and a electronic circuit and is installed in the support frame mounted close to the rear collimator. The plane of each block is perpendicular to the connecting line joining its center and the radiation source to make each detector element basically aligned with the active area of the radiation source. Thus it will assure that the γ-ray emitted from the cobalt-60 γ-ray source can be incident upon the sensitive area of each detection crystal after passing through the beam shutter, the front collimator, the container, and the rear collimator. One of the crystals, such as cesium iodide, cadmium tungstate, $BiGe_3O_{12}$ (BGO), $Gd_2SiO_5$ (Ce) (GSO), $Gd_3O_2S$ (GOS), $Lu_2(SiO)O(Ce)$ (LSO) can be used as the detector crystal, cesium iodide and cadmium tungstate are preferred.

Reflective white glue is put between scintillation crystals to prevent the light from become serial. Because these crystals lean against each other tightly to prevent the formation of dead space, so the image is more uniform. The cross section of the crystal is dependent on the photosurface of the silicon photodiode and is 10~50 mm², preferably 20~30 mm², and its length is ≦8 cm.

The crystal length is selected to make the detection efficiency to γ-ray >80%. Because various materials have different stopping power to γ-ray, so the required crystal length to reach a detection efficiency of 80% is different. Because the cross section of the scintillation crystal (10~50 mm²) is much smaller than the cross section of the gas detector pixel (≧100 mm²), the space resolution of the cesium iodide detector may be reached to 4 mm which is more less than that of the gas detector system, and the obtained image is clearer, finer and smoother. The "mosaic" seen in the image obtained from the gas detector system is not seen in the image obtained from CsI detector system.

The γ-ray intensity detected by each detector element is dependent on the absorption capacity of the object on the path through which γ-ray passes. If the density of the object is high, the absorption capacity to γ-ray is strong, the penetrated γ-ray is weak, the received γ-ray by the detector also weak and the output signal is weak. Then it will provide signals of different intensity for display in the successive steps.

The invention provides a cesium iodide or cadmium tungstate array detector which is characterized by that: the detection efficiency is high, more than 50%, so the image is clear with good quality. However, the detection efficiency of the best gas detector is only 13%. The scintillation crystal detector is not influenced by the temperature, pressure, vibration and electromagnetic interference. The materials used are robust, facilitated in processing, not easy to damage, small volume and lightweight. The operation is convenient, it only requires a voltage of 10 volts in normal operation. However, the gas detector operation needs high voltage of several hundred volts, and the spark easily occurs and requires staff to check frequently. There is no high pressure problem in the detector because it is operated under normal atmosphere, but the gas detector requires to fill gas to reach 50~100 atmospheric pressure and gas tightness and leakage problems occur. The operating life of the detector is more than 10 years. The rear collimator, the detector and its support frame, and the radiation catcher are combined to form an integration which is placed in an iron case. The dry cold air is blown into the case by a blower from the case bottom in order to assure the detector unit to be working in an atmosphere with specified temperature and humidity. Then the stability and operating life of the instrument are increased.

In order to absorb the γ-ray penetrated out from the detector, a radiation catcher made of iron and lead is set behind the part of the array detector perpendicular to the ground.

The container trailer system includes a detection trolley for carrying the container truck, a frequency control drive motor, a control system, a rail and a support rail beam. The detection trolley uses digital alternative frequency control system, is driven by the frequency control drive motor under the instruction of the master control system and moves forward along the rail at constant velocities. The velocities are: 6 m/min, 12 m/min and 18 m/min. The container truck is stopped on the detection trolley and passes through the inspection tunnel at a constant velocity along with the detection trolley to carry out the container inspection process.

According to condition and need, the following two methods for inspecting container are used: Firstly, the container truck is towed by steel cable of a hoist 13 and moved forward on smooth concrete ground or steel plate ground at a constant velocity to make the container received the scanning of γ-ray of a thin fan-shaped beam to complete the inspection process (see FIG. 5). And secondly, the container truck is driven by the driver to pass through the inspection tunnel (see FIG. 6). When truck nose line A—A reaches line X—X, the light from the photoelectric tube installed at point X is blocked up by the truck nose, then the photoelectric tube gives a signal to close the beam shutter and the cross bar 14 is actuated to be raised up to allow the container truck pass through. If the beam shutter is not closed, the cross bar can not be raised up. That is the cross bar is interlocked with the beam shutter. When the container front edge B—B line reaches line Y—Y, the light from the photoelectric tube at Y—Y is blocked up and the photoelectric tube gives signal to open the beam shutter, then γ-rays penetrate through the container to start inspection. At this time, the truck driver leaves the γ-ray of the thin fan-shaped beam by a distance of 2 m, and the dose rate from scattering radiation at that point is lower than the dose rate limit according to calculation and actual measurement. A lead plate or steel plate may be put behind the rear of the driver cabin if necessary, to make the driver safer. When the container rear edge line C—C leaves line Y—Y, the light from the photoelectric tube is not blocked up and the photoelectric tube gives signal to close the beam shutter. Meanwhile, the cross bar falls down and the container inspection activity is finished.

The two methods mentioned above may omit the trailer system and save manufacture cost of the trailer system and save the expenditure of constructing the related building. It will also decrease failure rate and reduce the shutdown time and maintenance cost.

In the container inspection equipment with cobalt-60 γ-ray source and cesium iodide or cadmium tungstate detector according to the present invention, the signal and image processing system uses digital circuit and advanced microcomputer and is placed in the master control and image processing room which are far away from the cobalt-60 γ-ray source and the irradiation tunnel. Four working stations equipped with image store and output equipment are provided to the Customs personnel for display image, and inspection, analysis and judgment of the object in the container. The main functions of image processing system are: local domain amplification, edge strengthening, gray level window and pseudo color window adjustment, ZOOM roaming window, store, reproduction, file, output, and print inspection report etc.

The automatic control system uses hierarchical and partitioned control. The system consists of a master computer (PC), a programmable logic control (PLC), radiation monitoring and sensors of position, temperature, humidity etc. In addition, the system is equipped with closed circuit TV monitoring and control. The main function of the automatic control system is to carry out the automatic control and surveillance for the γ-ray beam shutter, the trailer system, the doors of the source room and the detector room, the image system, the inspection tunnel and its gate and the whole process for container inspection, in order to assure personnel safety and the successful progress of inspection work. In addition, the system has the functions of self-check, failure diagnosis, display, isolation, parameter visualization and data storage etc. The system has excellent performance in reliability and practicality.

The inspection equipment provided by the invention can be installed in a stationary building or is easily disassembled and transported to any designated site.

The cask, the beam shutter and the front collimator of the γ-ray source are installed on the same chassis to form a complex (hereinafter to be referred to as source complex), the weight is about 1 ton. The rear collimator, the array detector and the radiation catcher are installed on the same chassis to form another complex (hereinafter to be referred to as detector complex), the weight is about 4.5 ton. The two complexes can be mounted on a general truck and transported to any place, for example, the container parking area on the concrete surface, both sides of the road and the railroad. As the two complexes are placed on the ground, a theodolite is used for measurement in horizontal and vertical direction to assure the slit of the front collimator is aligned with the slit of the rear collimator. The signal and image processing system, and the control system are mounted in an instrument vehicle which is a refitted large bus.

The container inspection equipment with cobalt-60 γ-ray source and cesium iodide or cadmium tungstate detector according to the present invention is characterized by that: The container inspection equipment according to the present invention collects cobalt-60 γ-ray source and cesium iodide or cadmium tungstate detector into a container inspection equipment and the shortcomings are overcome when electron accelerator is used as the radiation source and gas detector is used as the radiation detector in the container inspection system. The container inspection equipment of the invention has merits of both the cobalt-60 γ-ray source and the cesium iodide or cadmium tungstate array detector to make the equipment have an excellent performance of stability and reliability with high detection efficiency, clear image with good quality. The application is extensive, flexible, convenient and safe. There is basically no need to shut down for maintenance in the so-called equipment, the maintenance cost is about 30,000 USD per year which is about ½5~¼0 of that of the accelerator type inspection equipment, which is about 0.5~1.25 million USD per year. The equipment has high utilization rate and low radiation intensity and is easy to be shielded and protected with good safety performance. The manufacture cost is low and the sales price is only about one-third of that of the accelerator type inspection equipment. The occupied area is small, which is 1000 m², and is about one-fifth of that of the accelerator type inspection equipment, which is 5000 m². The construction cost is low, for example, the thickness of concrete shielding wall is 40 cm, but the thickness is 2~2.5 m for the accelerator type inspection equipment. The equipment is easy to manufacture and the production cycle is as short as 6~8 months while the production cycle of the accelerator type inspection equipment is 18 months in the USA and the UK. The cask of the cobalt-60 γ-ray source is made of tungsten alloy semi-sphere and lead semi-sphere and a beam shutter made of iron is provided. The beam shutter opens and closes automatically, it is flexible, convenient, safe and reliable. Because the cobalt-60 γ-ray source, the beam shutter and the front collimator are combined into an integration, and the rear collimator, the detector and the radiation catcher are combined into another integration, so both are facilitated for integrated installation and test. Therefore the equipment is easy to be kept at the optimum working condition and its operating life is extended.

The main purposes of the container inspection equipment with cobalt-60 γ-ray source and cesium iodide or cadmium tungstate detector according to the present invention are as follows: When the container inspection equipment is installed at seaport, land frontier customs, airport, vital communication line and railway station etc., it is used for inspecting large containers, container trucks, train carriage and air containers to detect contrabands, trafficking weapons and other dangerous goods. The equipment can also be mounted at assembly site of missile and large rocket for the inspection of abnormal condition during the charging of large object, such as missile, rocket, etc. and during assembly.

The inspection equipment according to the present invention also can be used in the field of non-destructive testing for detecting the internal defects of small objects such as crank, forging, casting, cylinder body, tab, fire processing object and its parts, pressure vessel and its parts etc., in order to find if there is any defects such as flaw, slag, and piped blowholes etc.

DETAILED DESCRIPTION OF PREFERRED EMBODIMENTS

Figure 1:
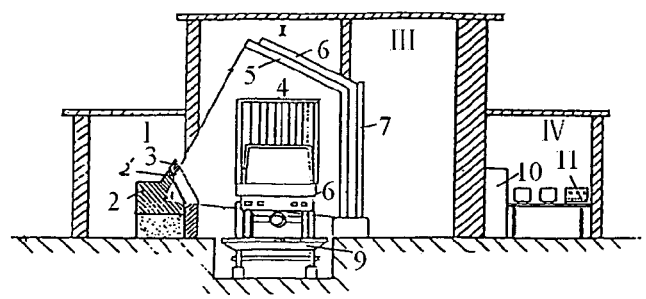
FIG. 1 is a schematic section view of the structure for the container inspection equipment with cobalt-60 γ-ray source and cesium iodide or cadmium tungstate detector according to the present invention.
Figure 2:
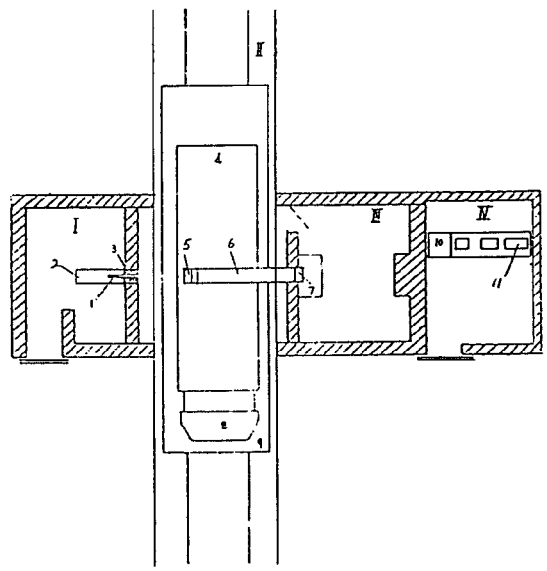
FIG. 2 is a schematic top view of the structure for the container inspection equipment with cobalt-60 γ-ray source and cesium iodide or cadmium tungstate detector according to the present invention.
Figure 3:
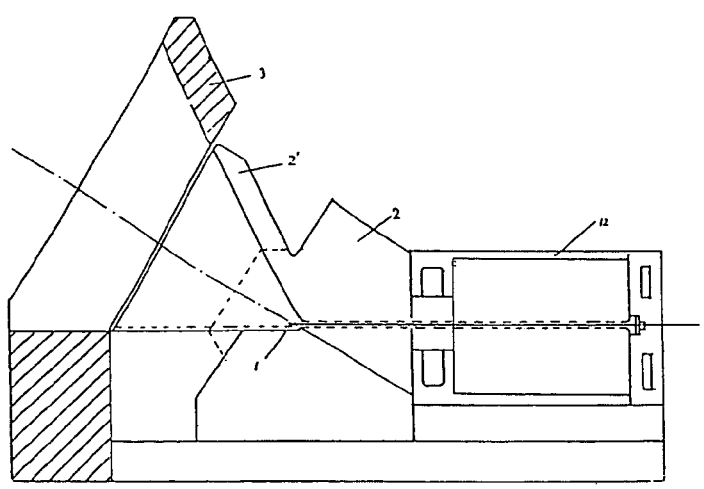
FIG. 3 is a diagram of a complex consisted of the transport flask for the cobalt-60 γ-ray source, the cask, the beam shutter, and the front collimator.
Figure 4:
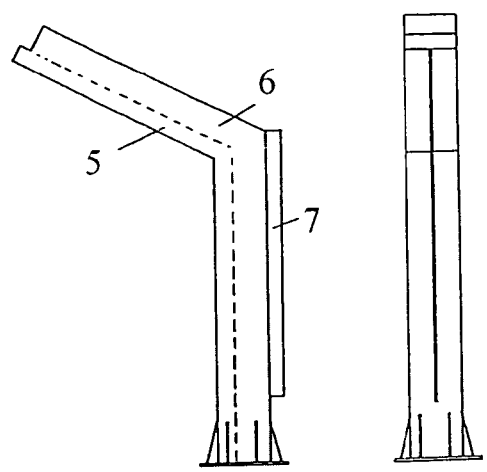
FIG. 4 is a schematic front view and side view of a complex consisted of the rear collimator, the array detector and the radiation catcher.
Figure 5:
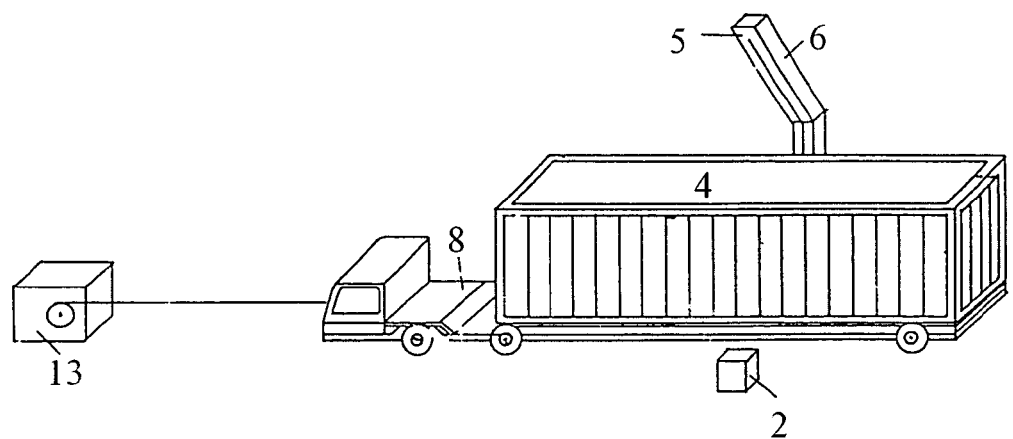
FIG. 5 is a diagram showing a container truck towed by the steel cable of a hoist for carrying out inspection.
Figure 6:
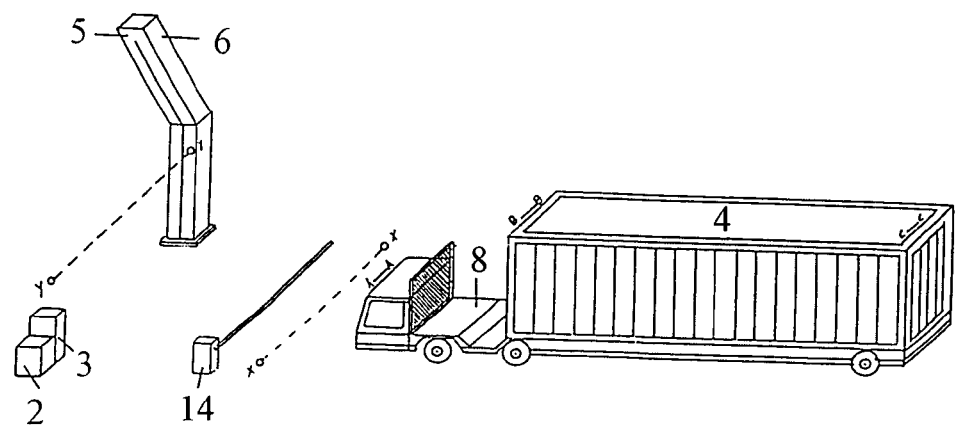
FIG. 6 is a diagram showing a container truck driven by a driver for carrying out inspection.
Figure 7:
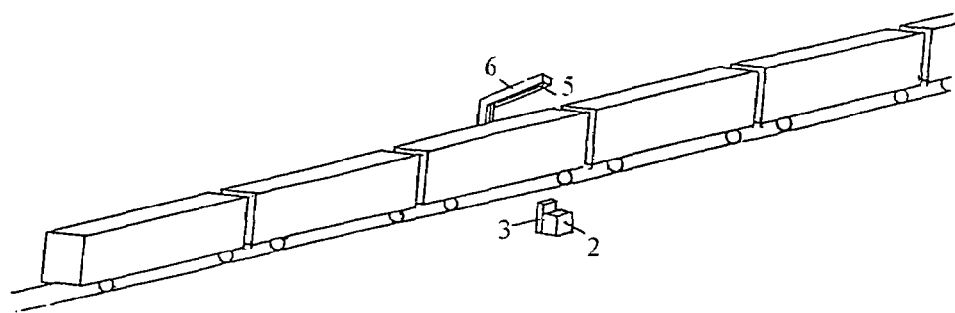
FIG. 7 is a diagram showing a rail car is being inspected by the container inspection equipment.
Figure 8:
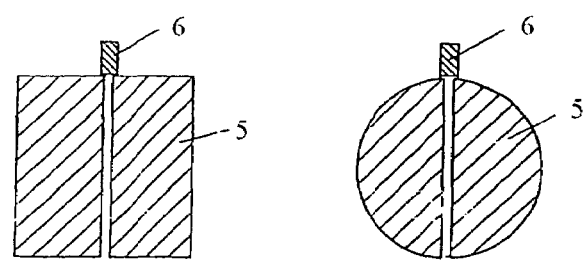
FIG. 8 is a diagram showing the rear collimator with cross section of square and circular shape.
Figure 9:
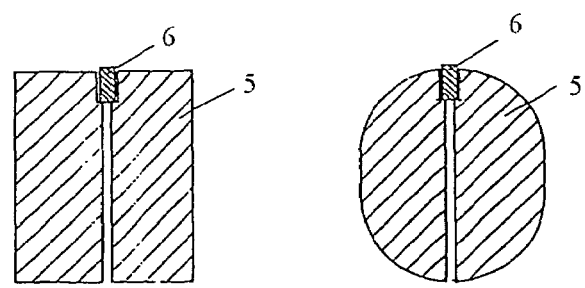
FIG. 9 is a diagram showing the rear collimator with a recess.

A detailed description of the invention is presented in conjunction with the accompanying drawings.

The container inspection equipment with cobalt-60 γ-ray source and cesium iodide or cadmium tungstate detector according to the present invention uses cobalt-60 γ-ray source and cesium iodide or cadmium tungstate detector. The radiation source 1 uses high specific activity cobalt-60 γ-ray or high specific activity cesium-137 γ-ray. The cask 2 with its beam shutter 2', and the front collimator 3 are fixed on the same chassis to form an integration and is placed on a concrete platform in source room I. The cobalt-60 γ-ray source 1 is transferred from the center of the cask 12, which is used in transportation, to the center of the cask 2, which is used in operation, by a steel cable. The rear collimator 5, the cesium iodide or cadmium tungstate detector 6 and the radiation catcher 7 are fixed on the same chassis to form an integration and is placed on the concrete ground in the detector room III. A container inspection tunnel II is located between the source room I and the detector room III. A long strip tunnel is formed in the inspection tunnel. A rail and a rail supporting beam are fixed on the concrete ground at the tunnel bottom. When truck 8 which carrys the container 4 is driven to the detection trolley 9 and stopped fully on it, the truck driver leaves the truck. The detection trolley 9 is driven by the frequency control drive motor under the instruction of the automatic control system 11 and moves forward along the rail at a constant velocity. The container and the truck on the detection trolley pass through the inspection tunnel II at the same constant velocity. When the container approximates the connecting line between the source and the detector, the automatic control system 11 sends out an instruction to make the beam shutter 2' automatically open. Then the γ-rays emitted from the cobalt-60 source or the cesium-137 source 1 passes through the slit of the beam shutter 2' and the front collimator 3 and are collimated to be a thin fan-shaped γ-ray beam with a horizontal field angle about 0.1° and a vertical field angle about 65°. The γ-ray beam passes through the container 4 and the slit of the rear collimator 5 and is incident upon the sensitive volume of each detector element in the cesium iodide or cadmium tungstate array detector 6 in the slit. Then the CsI scintillator gives out light. About 50% γ-rays are absorbed by the detector and produce electrical signal which is outputted after being rectified and amplified by electronic circuit. The magnitude of the output signal is proportional to the received γ-ray intensity at that position, whereas the γ-ray intensity at that position is dependent on the absorption capacity (i.e., mass thickness) of γ-ray to the object on the path through which γ-ray passes inside the container. The output signal from each detector element is sent to the signal and image processing system 10 in the master control and image processing room III by a cable. The signal is acquired, processed, arranged in order and displayed, an image scanning line is displayed on the screen of monitor. The image scanning line indicates the density distribution of the objects on the path through which γ-ray passes inside the container. As the container moves forward at a constant velocity, the fan-shaped γ-ray beam scans the objects one slice by one slice from the front to the rear of the container, and the scanning lines which reflect mass distribution of each slice of the objects in the container are displayed on the moniter screen one after another. After the fan-shaped γ-ray beam scans over the whole container, a complete two-dimensional radiation projection image of the objects in the container is shown on the monitor screen. Using a computer image processing system, the image can be processed by local amplification, edge strengthening, gray level window and pseudo color window adjustment, ZOOM and roaming window etc. Thus the image can be observed in detail in line groups of different hierarchies. Any smuggling goods, contrabands and articles of non-conformance with the container application form will be identified in the image. The direct γ-ray radiation passes out from the array detector 6 and the scattered radiation from the container 4 and other places are absorbed by the radiation catcher 7 and the concrete shielding wall between II and III to assure the radiation level in the master control and image processing room is below the radiation dose limits specified in the national "Radiation Protection Regulations".

EXAMPLE 1

The invention provides the container inspection equipment with cobalt-60 γ-ray source and cesium iodide or cadmium tungstate detector.

The container inspection equipment with cobalt-60 γ-ray source and cesium iodide or cadmium tungstate detector according to the present invention uses a high specific activity cobalt-60 γ-ray source 1 with a total activity 11.1 TBq (300 Ci) and a linear dimension of the active area 6 mm. The cask is made of tungsten alloy and lead. The beam shutter 2' and the front collimator 3 are made of iron. The γ-rays emitted from the cobalt-60 source are collimated by their slits to form a thin fan-shaped beam with a horizontal field angle 0.1° and a vertical field angle 65°. The detector 6 is a cesium iodide detector with the pixel dimension less than 50 mm². The detection efficiency of the detector 6 which consists of cesium iodide scintallator, silicon photo-diode and the related electronic circuit, to γ-ray of the cobalt-60 source is more than 50%. The cask 2, the beam shutter 2' and the front collimator 3 of the source are fixed on the same chassis to form an integrated complex (also referred to as the source complex) with length ≦1.5 m, width ≦0.7 m, and height ≦1.1 m, and the weight is about 1 ton. The source complex is placed on a concrete platform in the source room, its position can be moved backward and forward for changing the distance between the source and the detector to improve the image quality and extend the working life of the cobalt-60 γ-ray source. The rear collimator 5, the cesium iodide detector 6 and the radiation catcher 7 are fixed on the same chassis to form an integrated complex (also referred to as the detector complex) with a height about 6.5 m and a cross section area 700×700 mm². The rear collimator and the radiation catcher is made of iron.

The container trailer system consists of a 60t electric detection trolley 9 and its frequency control motor drive and control system, rails and rail support beam. The detection trolley 9 has a length of 18 m and a width of 3 m and moves at three constant velocities: 6 m/min, 12 m/min and 18 m/min. The detection trolley makes reciprocating movement along the rail in the tunnel. The container truck 8 is driven to the detection trolley and stopped fully on it, and then is transported by the detection trolley, passed through the thin fan-shaped γ-ray beam at a constant velocity until the inspection work is finished. The surface of the detection trolley is at the same level with the ground so that worker can easily get on and off the detection trolley. The move, stop and return of the detection trolley is controlled automatically by the master control system.

The automatic control system consists of a master computer (PC), a programmable logic control (PLC), radiation monitoring, and position, temperature, and humidity sensors, in addition, it is equipped with closed circuit TV for surveillance. The main targets to be controlled are the beam shutter, the container trailer, the doors of the source room and the detector room, the gate of the inspection tunnel, open and close of the detector and the imaging system, and the working condition of the auxiliary equipment. The control system can give action control signal to these equipments according to specified procedure and condition, and it also can check and display the working condition of these equipments.

The signal and image processing system uses digital circuit and advanced microcomputer and is placed in the master control and image processing room which are far away from the cobalt-60 γ-ray source and the irradiation tunnel. Four working stations equipped with image store and output equipment are provided to the Customs personnel for display image, and inspection, analysis and judgment of the object in the container. The main functions of image processing system are: local domain amplification, edge strengthening, gray level window and pseudo color window adjustment, ZOOM roaming window, store, reproduction, file, output, and print inspection report etc.

The following inspection performance indexes are obtained with the equipment of example 1:

1. It can find an iron wire with a diameter 2.5 mm or a thin iron piece of thickness 0.7 mm placed behind a steel sheet with thickness 100 mm, that is, IQI=2.5%, CI=0.7%;
2. It can find a lead brick or other black body placed behind a thick iron plate of thickness 230 mm, that is, the penetrating capacity for steel, SP=230 mm (iron);
3. The maximum inspection capacity is 20 containers per hour (for 40 feet international standard container); and
4. Maximum dose received by the object in the container is <16 μ GY for once inspection.

These indexes fully meet the requirements of the Customs in search for smugglers.

What is claimed is:

1. A container inspection equipment with the cobalt-60 γ-ray source or the cesium-137 γ-ray source and a cesium iodide or cadmium tungstate detector, comprising:
   a γ-ray source and a cask for shielding the source;
   a front collimator and a rear collimator;
   a detector and the related electronic circuit;
   a signal and image processing system; and
   a container trailer system and an automatic control system, wherein:
   the radiation source is a cobalt-60 γ-ray source or a cesium-137 γ-ray source;
   the detector is a cesium iodide or cadmium tungstate array detector;
   the cobalt-60 γ-ray source or the cesium-137 γ-ray source is equipped with a beam shutter configured to automatically open and close, the beam shutter is connected with the cask of the γ-ray source;
   the cesium iodide or cadmium tungstate array detector is a strip array constituted of blocks in series arrangement consisting cesium iodide or cadmium tungstate scintillator crystals each coupled to a silicon photodiode and an electrical circuit;
   the cask of the cobalt-60 γ-ray source or the cesium-137 γ-ray source, the beam shutter, and the front collimator are fixed on a first common chassis that is placed in a source room;
   the rear collimator, the cesium iodide or cadmium tungstate array detector and a radiation catcher are fixed on a second common chassis that is placed in a detector room; and
   between the source room and the detector room is a container inspection tunnel.

2. The container inspection equipment of claim 1, wherein the activity of the cobalt-60 γ-ray source is ≦20.35 TBq.

3. The container inspection equipment of claim 1, wherein the cask of the cobalt-60 γ-ray source or the cesium-137 γ-ray source consists of a tungsten alloy semi-sphere and a lead semi-sphere, being enveloped by a stainless steel case to form an integrated cask.

4. The container inspection equipment of claim 3, wherein the beam shutter is a swing type iron shutter, the shutter is opened or closed using an electromagnetic driver and a restoring spring, the open or close duration is less than 0.3 second, the beam shutter is connected with the tungsten alloy semi-sphere of the cask, a collimating slit between them is accurately aligned with a slit of the front collimator, and the slit width is 6~8 mm.

5. The container inspection equipment of claim 4, wherein the front and the rear collimators are made of iron, lead and the alloys thereof, in the shape of a single dog leg line, the width of the slit is 6~8 mm.

6. The container inspection equipment of claim 1, wherein the cesium iodide or cadmium tungstate array detector is a strip array constituted of blocks in series arrangement in the vertical direction consisting plurality of cesium iodide or cadmium tungstate scintillator crystals each coupled to a silicon photodiode and an electrical circuit.

7. The container inspection equipment of claim 1, wherein the cross section of the scintillation crystal is a strip of 10~50 mm$^2$, the length is ≦8cm.

8. The container inspection equipment of claim 1, wherein the container trailer system includes a detection trolley for carrying a container truck, a frequency control drive motor, a control system, a rail and a support rail beam.

9. The container inspection equipment of claim 1, wherein the signal and image processing system uses digital circuit and microcomputer and is located in a master control and image processing room which is remote from the cobalt-60 γ-ray source or the cesium-137 γ-ray source and the inspection tunnel.

10. The container inspection equipment of claim 1, wherein the automatic control system includes a master computer, programmable logic control, radiation dose monitoring, and position, temperature, and humidity sensors, and closed circuit TV for surveillance.

* * * * *

UNITED STATES PATENT AND TRADEMARK OFFICE
CERTIFICATE OF CORRECTION

| | | |
|---|---|---|
| PATENT NO. | : 7,082,186 B2 | Page 1 of 1 |
| APPLICATION NO. | : 10/480448 | |
| DATED | : July 25, 2006 | |
| INVENTOR(S) | : Zhao et al. | |

It is certified that error appears in the above-identified patent and that said Letters Patent is hereby corrected as shown below:

Title Page of Patent

(75) Inventors: delete "Jinggi Zhao" and insert --Jingqi Zhao--; delete "Yongging Li" and insert --Yongqing Li--.

Signed and Sealed this

Tenth Day of April, 2007

JON W. DUDAS
*Director of the United States Patent and Trademark Office*